Patented Oct. 19, 1948

2,452,012

UNITED STATES PATENT OFFICE 2,452,012

NITRILES

Paul J. Flory, Kent, Ohio, assignor to Wingfoot Corporation, Akron, Ohio, a corporation of Delaware No Drawing. Application February 20, 1946, Serial No. 649,133

4 Claims. (Cl. 260—464)

This invention relates to new chemical compounds. More specifically the invention relates to nitriles prepared from cyclic diketones and to amines, esters, acids and acid amides prepared from the nitriles.

The new nitriles are prepared from cyclic diketones having the structural formula

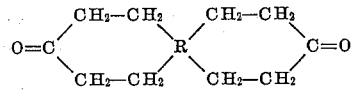

in which R is a tetravalent aliphatic hydrocarbon radical, a tetravalent aliphatic oxahydrocarbon radical, or a tetravalent aliphatic thiahydrocarbon radical, said radicals having two of the four unreacted valence bonds attached to each of two separate carbon atoms. Typical examples of the radicals included within the scope of the expression "R" in the above structural formula are

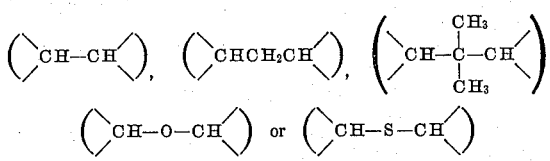

These diketones are prepared by the hydrogenation of diphenols under pressure in the presence of a finely divided nickel catalyst and the hydrogenated diphenols thereby produced are subsequently oxidized or dehydrogenated to form the corresponding diketones.

The new nitriles have the structural formula

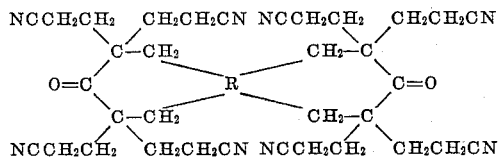

wherein R is a tetravalent aliphatic hydrocarbon, oxahydrocarbon, or thiahydrocarbon having two unreacted valence bonds attached to each of two separate carbon atoms.

The new nitriles are prepared by reacting the cyclic diketones of the type above described with acrylonitrile and recrystallizing the resulting addition product from a suitable solvent. The nitriles may subsequently be converted to amines by a suitable reduction process, for example heating with hydrogen under pressure in the presence of a suitable catalyst, such as finely divided nickel. The nitriles may be converted into octabasic acids by hydrolyzing with alkali and subsequently neutralizing the salt thereby formed with a strong mineral acid. Alternatively the octabasic acids may be prepared by hydrolyzing the nitriles with an acid, such as sulfuric, hydrochloric or phosphoric acids. Esters may be prepared from the nitriles by reaction with an alcohol such as methyl, ethyl, benzyl, allyl, cyclohexyl and chloroethyl alcohols in the presence of an acid catalyst, or by interaction of the octabasic acid with any of the alcohols in the presence of a suitable esterification catalyst, such as sulfuric acid or p-toluene sulfonic acid. The corresponding amides may be prepared from the acids by heating with ammonia, or a primary or secondary amine. Acid chlorides may be synthesized by reacting the acids with thionyl chloride or phosphorus pentachloride. Various mixed products may be prepared by partially completing any of the above reactions, whereby compounds containing two or more different types of functions, such as nitrile, acid, ester and amide radicals are formed.

The new nitriles are useful intermediates for the preparation of valuable amines, acids, esters and amides as above described. The octabasic acids and the corresponding esters are valuable in the synthesis of non-linear condensation polymers. The ester, and especially the esters of higher molecular weight alcohols, are valuable plasticizers for many synthetic plastics.

In application Ser. No. 674,656, filed June 5, 1946, by Paul J. Flory, there are described and claimed condensation polymers prepared from aminoacids and carboxylic acids having from 6 to 12 carboxylic acid groups.

Further details of the preparation and use of the new compounds are set forth in the following examples.

*Example 1*

A one liter reaction flask was mounted in a cold water bath and charged with 18.4 grams of 4,4'-diketodicyclohexyl, 1.3 cc. of a 38 percent aqueous solution of trimethylbenzylammonium hydroxide and 80 cc. of dioxane. While stirring the solution vigorously, 41.5 grams of acrylonitrile were added dropwise. During the reaction a crystalline substance was precipitated in the reaction flask. After the addition was complete the reaction mass was stirred for an additional 15 hours and subsequently diluted with an equal volume of water. The crystalline precipitate was removed by filtration, washed with acetone and recrystallized from a formamide-nitromethane mixture. The white crystalline material so obtained was identified as 3,3,5,5,3', 3', 5', 5'-octa-(beta-cyanoethyl)-4,4'-diketodicyclohexyl.

*Example 2*

A 6.3 gram portion of the octanitrile prepared in accordance with the procedure set forth in Example 1 was suspended in 35 cc. of 85% phosphoric acid and was heated for 48 hours on a steam bath. The reaction mixture, which had become solid, was diluted with water, cooled and filtered. The precipitate was dissolved in the minimum amount of 20% sodium hydroxide and heated to approximately 100° C. An excess of concentrated hydrochloric acid was added and the solution allowed to cool, whereupon a white crystalline deposit was obtained. The white needle shaped crystals were separated by filtration and identified as the octabasic acid corresponding to the nitrile prepared by Example 1.

*Example 3*

Five grams of the octabasic acid prepared in accordance with the procedure of Example 2 was suspended in 35 cc. of absolute ethyl alcohol and 1 cc. of concentrated sulfuric acid and refluxed for 8 hours. The product was extracted with ether and the ether extracts washed with a saturated solution of sodium bicarbonate and then dried by filtration through anhydrous sodium sulfate. After the ether was evaporated the crude ester so obtained was recrystallized from ether as the ethyl ester of the octabasic acid (M. P. 81–82.5° C.) prepared in Example 2.

*Example 4*

A five gram sample of the octabasic acid and 15 grams of octadecylamine were heated at 155° C. for four hours in an inert atmosphere. The slightly viscous, light brown colored liquid so obtained was evacuated for 5 minutes to remove air bubbles and then heated under atmospheric pressure at 218° C. for one hour. The heating at 218° C. was continued for another hour at a pressure of 35 mm. The opaque reaction mass which solidified upon cooling to a hard brittle mass was washed with hot acetone filtered and dried. The product was crystallized from hot ethly acetate solution and identified as the N-octadecylamide of 3,3,5,5,3',3',5',5'-octa(beta - ethyl carboxy)-4,4'-diketodicyclohexyl having the structural formula

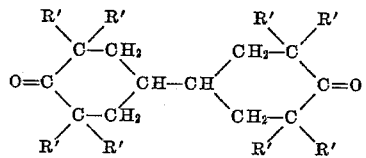

wherein R' is the radical

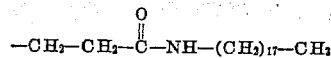

In accordance with this invention other octanitriles may be prepared by methods analogous to that described in Example 1, for example bis [3,3,5,5 - tetra - (beta - cyanoethyl)4 - keto - cyclohexyl] methane 2,2-bis [3,3,5,5, - tetra-(beta - cyanoethyl)4-ketocyclohexyl] propane bis [3,3,5,5-tetra-(beta-cyanoethyl)4-ketocyclohexyl] ether bis [3,3,5,5 - tetra -(beta-cyanoethyl)4-ketocyclohexyl] sulfide Although the invention has been described with respect to specific embodiments thereof it is not intended that the details shall be construed as limitations upon the scope of the invention, except to the extent incorporated in the following claims.

I claim:

1. As a new chemical compound, 3,3,5,5,3',3',-5',5',-octa(beta - cyanoethyl)-4,4'-diketodicyclohexyl.

2. As a new chemical compound, bis[3,3,5,5 tetra (beta - cyanoethyl) - 4 - ketocyclohexyl] methane.

3. As new chemical compound, 2,2 bis[3,3,5,5 tetra (beta - cyanoethyl) - 4 - ketocyclohexyl] propane.

4. As a new chemical compound, a compound selected from the group consisting of 3,3,5,5,3',3',5',5' - octa(beta - cyanoethyl) - 4,4'-diketodicyclohexyl; bis[3,3,5,5 tetra(beta-cyanoethyl)-4-ketocyclohexyl]methane; and 2,2 bis[3,3,5,5 tetra(beta - cyanoethyl) - 4 - ketocyclohexyl] propane.

PAUL J. FLORY.

REFERENCES CITED

The following references are of record in the file of this patent:

UNITED STATES PATENTS

| Number | Name | Date |
| --- | --- | --- |
| 2,386,736 | Bruson | Oct. 9, 1945 |
| 2,386,737 | Bruson | Oct. 9, 1945 |
| 2,403,570 | Wiest | July 9, 1946 |